United States Patent [19]

Sutz et al.

[11] 4,427,342
[45] Jan. 24, 1984

[54] STRAIGHT LINE DRIVE MECHANISM DRIVABLE BY WIND OR OTHER POWER SOURCE

[75] Inventors: Richard K. Sutz, Scottsdale; Louis J. Grunwald, Sun City, both of Ariz.

[73] Assignee: Wind Baron Corporation, Phoenix, Ariz.

[21] Appl. No.: 311,514

[22] Filed: Oct. 15, 1981

[51] Int. Cl.³ .................. F01D 25/00; F03D 11/00
[52] U.S. Cl. ......................... 416/170 R; 74/41; 74/103
[58] Field of Search ............ 416/9, 10, 13, 15, 170 R, 416/170 A; 417/334; 74/590, 381, 589, 41, 103, 592

[56] References Cited

U.S. PATENT DOCUMENTS

| | | | |
|---|---|---|---|
| 182,394 | 9/1876 | Williams | 74/41 X |
| 338,203 | 3/1886 | Stough et al. | 416/13 |
| 344,886 | 7/1886 | Wagner | 416/13 |
| 450,736 | 4/1891 | Corcoran | 416/13 |
| 455,255 | 6/1891 | Kenoyer | 74/590 |
| 495,294 | 4/1893 | Black | 74/592 |
| 501,355 | 7/1893 | Myers | 416/13 |
| 525,778 | 9/1894 | Williamson | 74/592 X |
| 556,914 | 3/1896 | Bramwell | 416/12 |
| 559,082 | 4/1896 | McDermott | |
| 581,613 | 4/1897 | Pippin | 74/590 X |
| 622,842 | 4/1899 | Dietz | 74/592 |
| 623,402 | 4/1899 | Hong | 416/9 |
| 633,619 | 9/1899 | Smith | 74/41 |
| 656,922 | 8/1900 | Alger | 416/13 |
| 716,658 | 12/1902 | Benster | 416/13 |
| 716,786 | 12/1902 | Terry | |
| 718,667 | 1/1903 | Smith | 416/13 |
| 748,485 | 12/1903 | Curtis | |
| 749,236 | 1/1904 | Smith et al. | 74/592 |
| 817,794 | 4/1906 | McKay | 74/590 |
| 836,491 | 11/1906 | Doty | 74/103 X |
| 914,385 | 3/1909 | Cotten | 74/590 X |
| 1,085,556 | 1/1914 | Evans | |
| 1,148,519 | 8/1915 | Macomber | 416/13 |
| 1,277,382 | 9/1918 | Chapman et al. | 74/41 |
| 1,328,218 | 1/1920 | Wilson | 74/103 X |
| 1,564,320 | 12/1925 | Callahan | 74/41 |
| 1,994,592 | 3/1935 | Robinson | 74/592 X |
| 2,045,552 | 6/1936 | Mann | 74/41 |
| 2,145,704 | 1/1939 | Wood | 74/592 UX |
| 2,178,122 | 10/1939 | Ostler et al. | 74/592 |
| 2,972,264 | 2/1961 | Birkbeck et al. | 74/592 |
| 3,680,881 | 8/1972 | Douglas | 74/103 X |
| 3,782,222 | 1/1974 | Berggren | 74/590 |
| 4,211,126 | 7/1980 | Sutz | 74/590 |
| 4,249,867 | 2/1981 | Cunningham | 417/334 |

FOREIGN PATENT DOCUMENTS

| | | | |
|---|---|---|---|
| 25896 | 3/1930 | Australia | 74/590 |
| 563253 | 11/1932 | Fed. Rep. of Germany | 416/9 |
| 819079 | 7/1949 | Fed. Rep. of Germany | |
| 928040 | 4/1955 | Fed. Rep. of Germany | 416/9 |
| 705691 | 3/1954 | United Kingdom | |

*Primary Examiner*—Philip R. Coe
*Assistant Examiner*—Frankie L. Stinson
*Attorney, Agent, or Firm*—Jacob B. Burke

[57] ABSTRACT

This gearless straight line drive mechanism has a first shaft driven by wind power or other power source. The shaft drives rotatable crank arms which reciprocate connecting rods carrying a horizontal second shaft. The second shaft moves up and down. It carries and extends through the centers of flat, symmetrical, vertical links. Pivotally mounted guide arms are connected to ends of the links to move them in opposite arcuate directions while the second shaft is constrained by the guide arms and links to move in a precisely vertical path. The second shaft carries a pump rod for cyclically operating a lift pump. The guide arms may carry counterbalance weights or the guide arms may be loaded by springs, which apply forces via the guide arms and links to cyclically assist the second shaft and pump rod in lifting a load.

7 Claims, 20 Drawing Figures

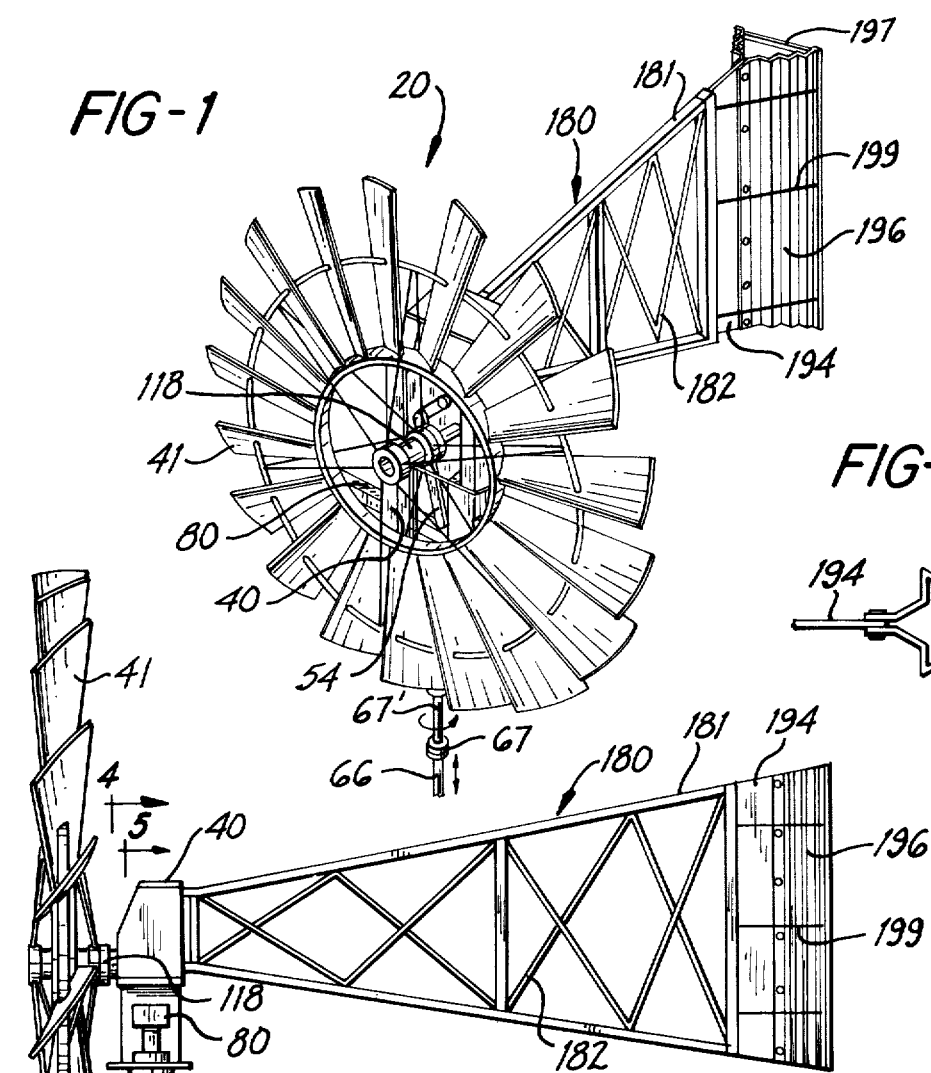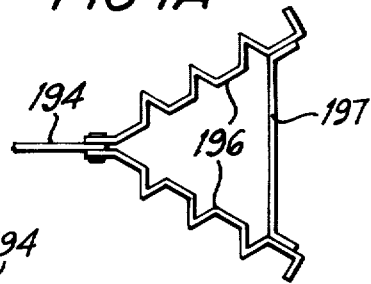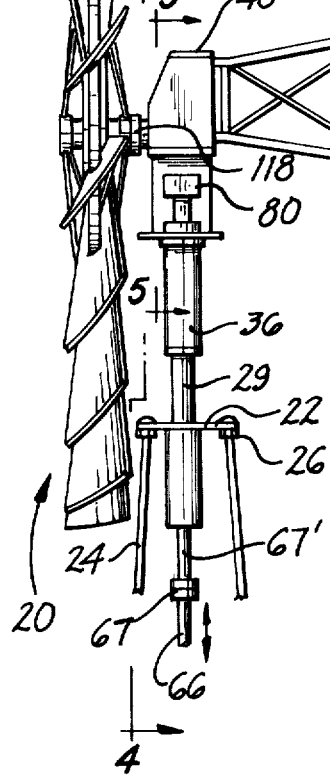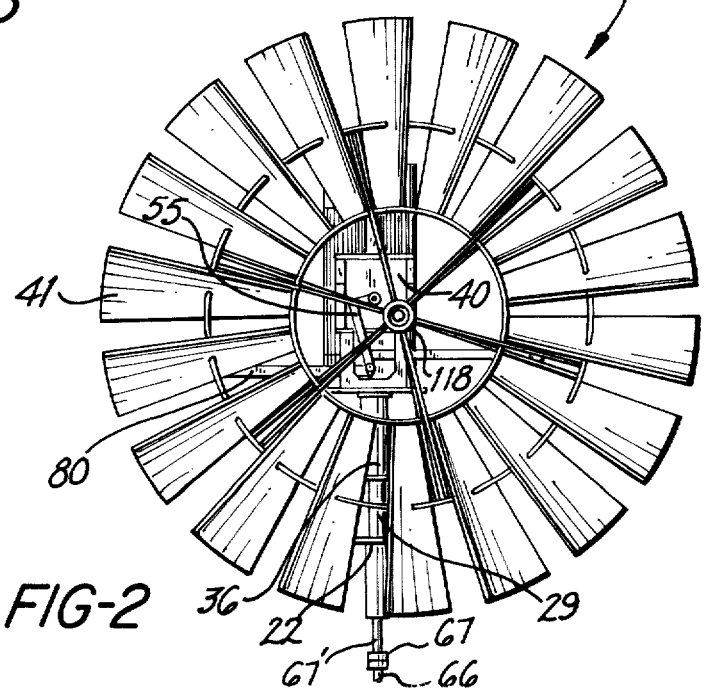

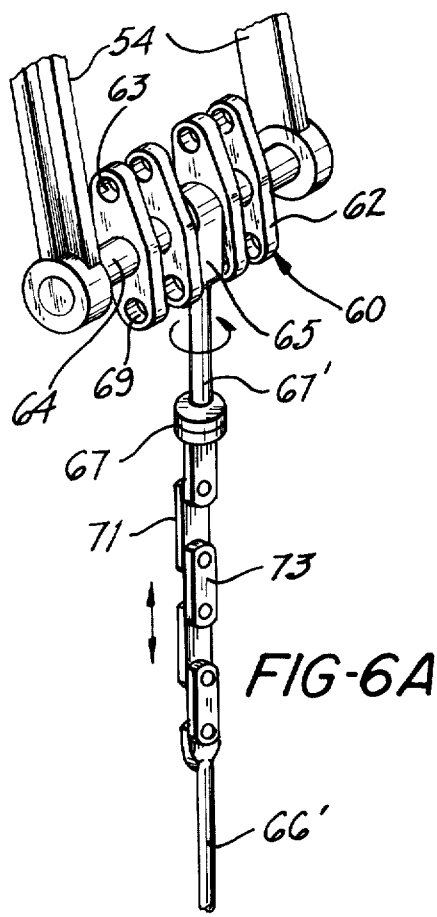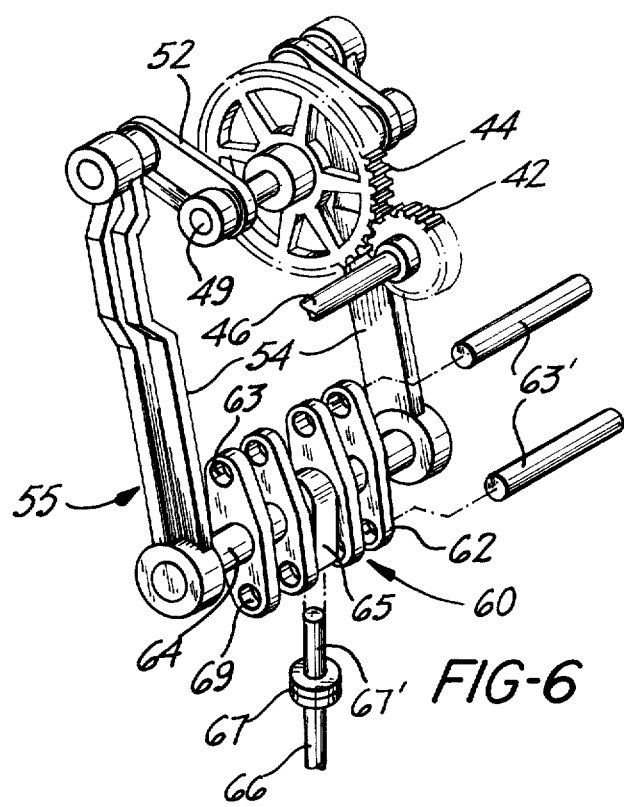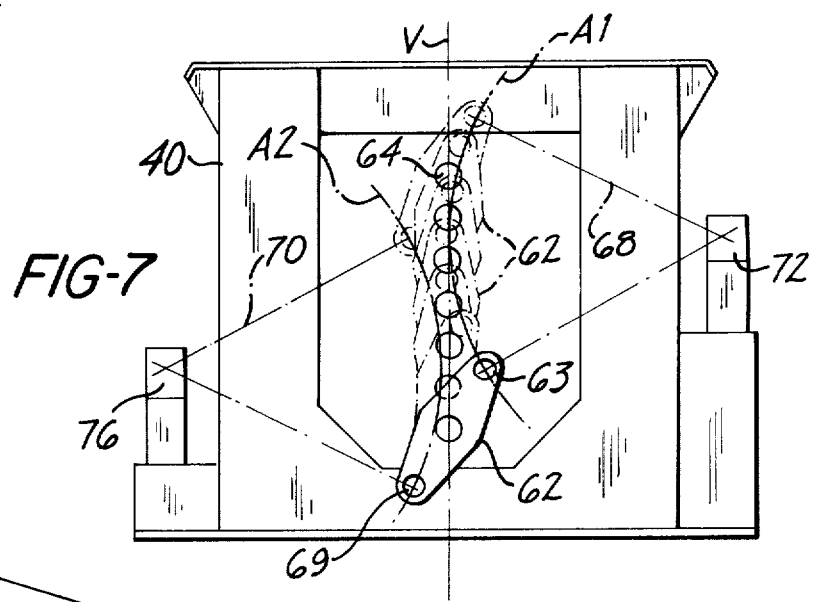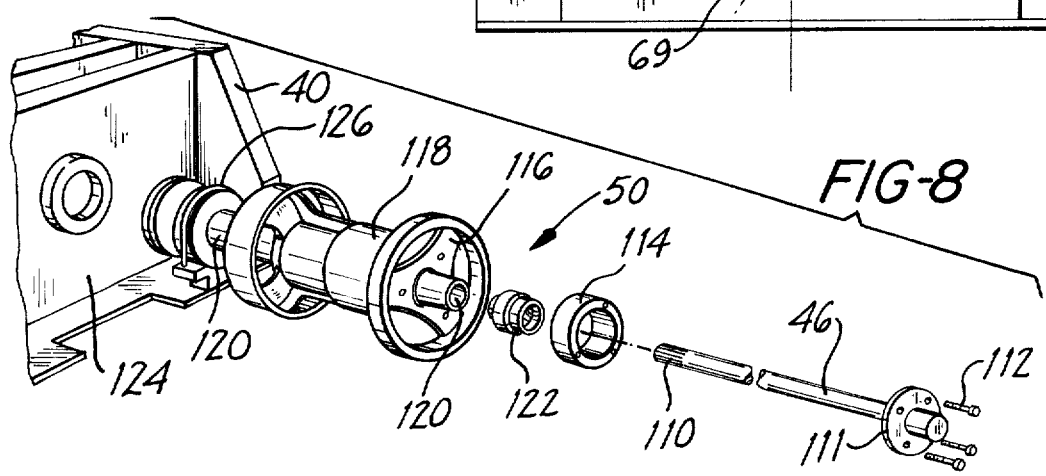

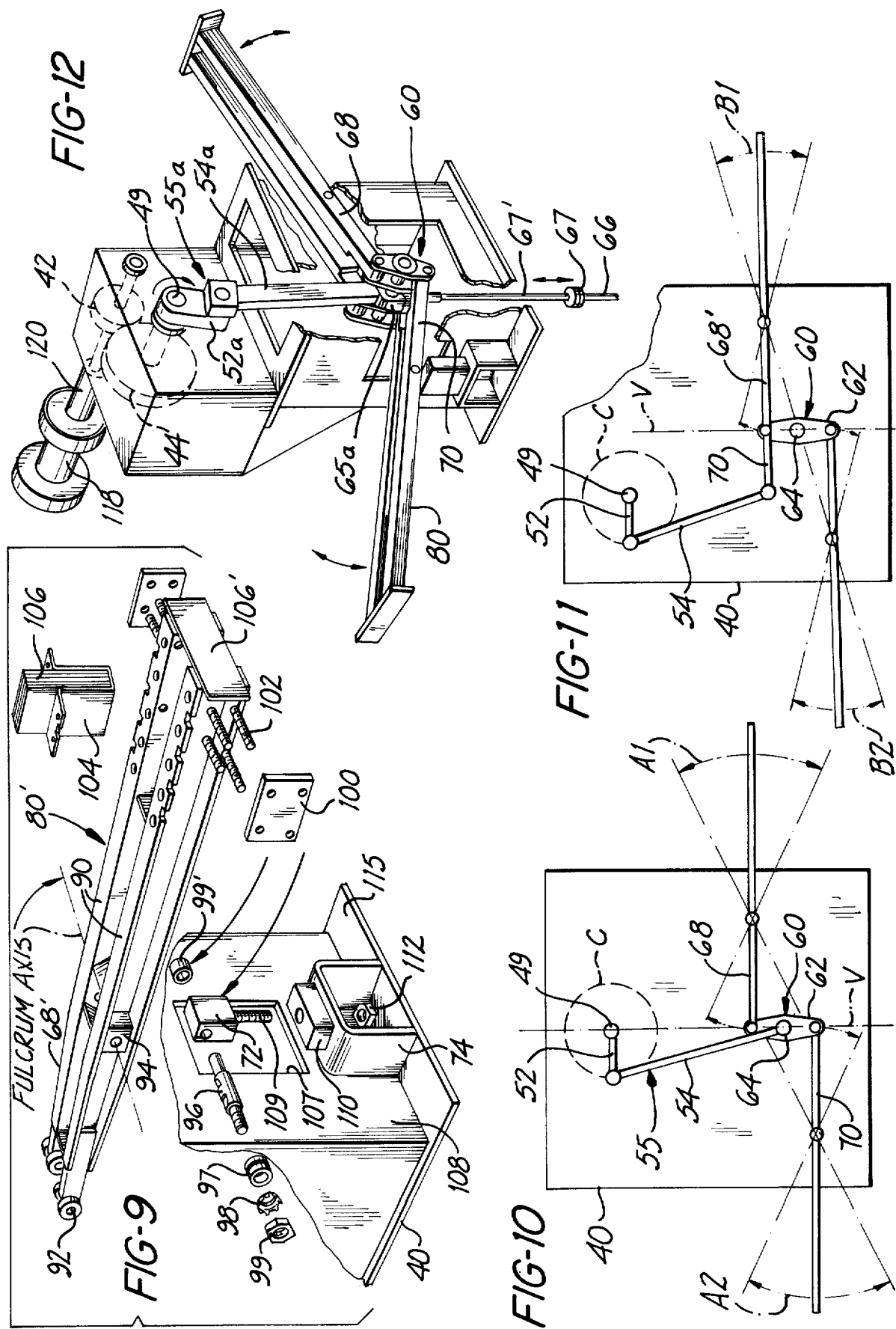

STRAIGHT LINE DRIVE MECHANISM DRIVABLE BY WIND OR OTHER POWER SOURCE

This invention relates to the art of windmills, and more particularly concerns a mechanism for a windmill head especially adapted for pumping water. The windmill head can be assembled on the ground and mounted as a unit on a windmill tower.

The invention involves improvements in a power driven mechanism which converts rotational motion to reciprocation motion, and further involves refinements which improve counterbalancing, wind tracking and other functions of a windmill system useful for operating a liquid pump such as a water pump.

For purposes of the following descripiton of the invention, the term "windmill head" is used to denote an assembly mountable on a windmill tower to drive a vertically reciprocatable load lifting element such as a rod or chain. The term "windmill tower" refers to a tapered framework conventionally standing on the ground, wide at the bottom, narrow at the top and strong enough to support an operating windmill head.

The present invention embodies improvements over the windmill structure described in prior U.S. Pat. No. 4,211,126, issued July 8, 1980 to R. K. Sutz, one of the joint inventors herein. The invention also involves improvements over the prior art as exemplified by U.S. Pat. No. 4,249,867 issued to D. C. Cunningham and U.S. Pat. No. 3,782,222, issued to J. L. Berggren. In the prior art windmill systems counterbalancing of a vertically lifted pump rod is effected by weighted arms pivotally mounted on the frame of a windmill tower. Many existing windmill towers cannot be adapted to carry such counterbalance structures, and there are serious disadvantages in mounting counterbalance arms on the frame of a windmill tower.

It has heretofore been proposed in German Pat. No. 819079 issued Oct. 29, 1951 to F. Koster, to provide a counterbalance arm for a windmill head mounted on a windmill tower. The primitive structure proposed by the German patentee has many deficiencies and disadvantages and was impractical. For example, it was not capable of reciprocating a pump rod in a precisely vertical direction, and it was not capable of raising or setting the counterbalance arm without undesirably pushing down on the load lifting pump rod.

The present invention overcomes the above mentioned and other difficulties and disadvantages of prior windmill structures by providing a windmill head in which the counterbalance means are included in the windmill head and are arranged so that they do not push down on the load lifting pump rod. This new windmill head can be completely assembled on the ground and hoisted into place on top of an existing windmill tower. The mechanism is so constructed that it can readily be adapted for use on the ground to drive a liquid pump such as an oil or water pump. Furthermore all prior water pumping windmills other than that described in prior patent 4211126 mentioned above, have been designed to lift only. They were not designed to exert a push-down force. All such prior attempts to employ counterbalancing in windmills used for pumping water have been limited to counterbalancing less than 100% of the weight of the load lifting sucker rod. If the setting of such prior counterbalancing arms was such that counterbalancing exceeded 100% of the weight of the load lifting sucker rod, the windmill was forced to push down on this sucker rod and damage to the windmill always occurred. Thus no prior counterbalance arrangement other than that described in U.S. Pat. No. 4,211,126 referred to above, has ever proven practical.

It is therefore a principal object of the invention to provide a mechanism which can be driven by wind or other power source, which can form part of a windmill head that can be assembled on the ground and then mounted as a unit on top of a windmill tower, or used on the ground to drive a lift pump.

It is a further object of the present invention to provide a cyclically operating gearless straight line drive mechanism which applies a down push on pivoted arms to lift and reset counterbalance means such as arms or springs, for assisting the next lift of a load by a pump rod, and which includes a lost motion device to avoid imposing a downward force on the load lifting pump rod which normally moves down by its own weight.

A further object of the invention is to provide a mechanism for a windmill head which embodies the following features:

1. An improved power drive mechanism which is of simpler construction yet which provides better performance when used for water pumping.

2. Novel mounting means for a wind driven fan.

3. Novel types of counterbalancing for loads lifted by the mechanism.

4. Improved wind tracking capabilities responsive at all wind velocities.

5. A novel gearless straight line drive mechanism including articulated crank arm and connecting rod elements for reciprocating a load lifting member up and down, while a linkage and counterbalanced or spring loaded guide arms constrain the load lifting member to move precisely vertically at all times, and assist the articulated elements in raising the load lifting member.

6. Improved bearing arrangements to resist up, down and laterally directed forces on the windmill head.

7. An improved housing for supporting parts of the windmill head.

8. A windmill head system which is lighter in weight than prior windmill heads, which is stronger and more reliable in service, which will operate at lower wind speeds than conventional windmills, which will track changing wind directions at lower wind speeds than prior windmills, and which will be more economical to to install and maintain and to manufacture.

Other and further features, objects and advantages of the invention will become apparent from the following detailed description taken together with the drawings, wherein:

FIG. 1 is a perspective view of a windmill head embodying the invention.

FIG. 1A is a top plan view of a tail vane assembly used in the windmill head.

FIG. 2 is a front elevational view of the windmill head of FIG. 1.

FIG. 3 is a side elevational view of the windmill head.

FIG. 6 is a further enlarged perspective view of parts of the mechanism.

FIG. 6A is a fragmentary perspective view similar to a portion of FIG. 6, showing a lost motion device forming part of the invention.

FIG. 7 is a diagram illustrating the mode of operation of the straight line drive mechanism.

FIG. 8 is an exploded perspective view of parts of the straight line drive mechanism.

FIG. 9 is an enlarged exploded perspective view of a counterbalance arm assembly.

FIG. 10 and FIG. 11 are diagrams illustrating alternate ways of arranging the working parts of the windmill mechanism.

FIGS. 12-16 are perspective views illustrating modifications of the invention with respect particularly to counterbalance arrangements.

Figure 4:
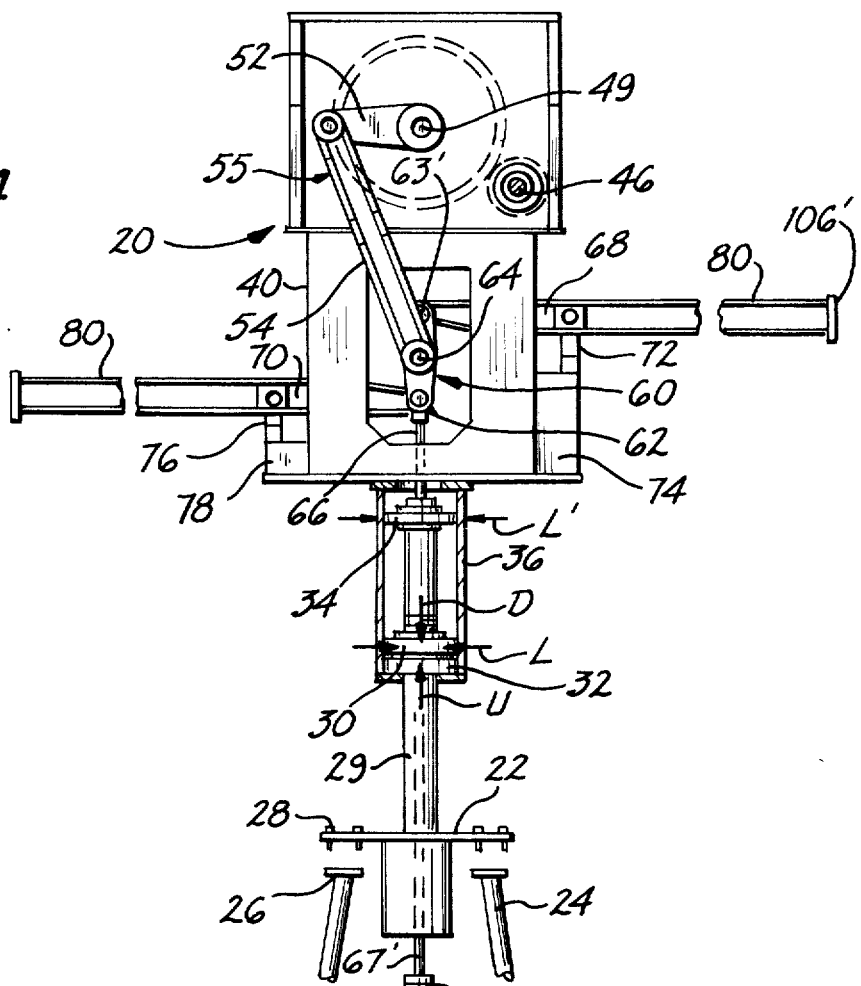
FIG. 4 is an enlarged sectional view taken on line 4—4 of FIG. 3.

Referring first to FIGS. 1-5, there is shown a windmill head 20 having a base plate 22 adapted for mounting in a horizontal position on top of a windmill tower 24. The tower may have flanges 26 at the tops of its rails to which plate 22 can be secured by bolts 28.

On the base or mounting plate 22 is secured an axially vertical stationary tube or sleeve 29. About midway up the tube are mounted two sets of roller bearings 30, 32; see FIG. 4. Another set of roller bearings 34 is mounted near the top of tube 29. A cylindrical casing 36 surrounds and is secured to the outer races of bearings 30, 32, 34, so that the casing rotates with respect to the stationary cylindrical tube 29. The lower bearings are arranged to resist upwardly directed forces and upper bearings 30 resist downwardly directed forces, as indicated by arrows U and D respectively. Laterally directed forces are resisted by all bearings as indicated by arrows L and L'.

Mounted on casing 36, secured to it and rotating with it is a generally rectangular housing 40 supporting rotatable fan or wind wheel 41. In the upper part of the housing is a gear train consisting of a single small pinion gear 42 driving and meshed with a large spur gear 44; see FIG. 4. Gear 42 is driven by a shaft 46 which is itself driven by fan 41 through a coupling assembly 50 described below in connection with FIG. 8.

Large gear rotates on a shaft 49 which rotates two parallel crank arms 52; see FIG. 7. At the outer end of each crank arm is pivotally connected a pitman or connecting rod 54. Each crank arm and connected pitman constitute an articulated linkage 55. There are two such linkages which cooperate in reciprocating straight line drive linkage 60, best shown in FIGS. 4, 5 and 6.

Drive linkage 60 comprises one or more rather oval, flat, elongated, symmetrical vertical links or levers 62 which turn angularly in vertical planes on a centrally located shaft 64. Shaft 64 carries a connecting block 65 to which a load lifting rod 66 can be connected via swivel joint or bearing 67 and short shaft 67'. Shaft 67' connects directly to block 65. This arrangement permits drive linkage 60 to rotate on a vertical axis with housing 40 without turning rod 66. In a preferred construction, the lower ends of pitmans 54 are connected to shaft 64. At upper ends of levers 62 are apertures 63 where is pivotally secured one end of a guide arm 68. At lower ends of levers 62 are apertures 69 where is pivotally secured one end of a guide arm 70. Upper guide arm 68 pivots on upper fulcrum block 72 supported by bracket 74 mounted on housing 40. Lower guide arm 70 pivots on lower fulcrum block 76 supported on bracket 78 mounted on housing 40.

In operation of the straight line drive mechanism, shaft 64 and connecting block 65 will reciprocate in a precisely vertical path. This is illustrated graphically in FIG. 8 where shaft 64 is shown in different positions as it moves up and down on vertical line V while upper and lower ends of links 62 move in circular arcs A1 and A2 constrained by guide arms 68, 70 pivoting on fulcrum blocks 72, 76 carried by housing 40. Circular arcs A1 and A2 are oppositely curved. The links all move in a shallow or lazy "S" while their center moves straight up and down. Load lifting rod 66 secured to connecting block 65 via swivel 67 and shaft 67' moves up and down with block 65 and shaft 64.

Each guide arm 68, 70 has an integral extension 80 which serves as a counterbalance arm or beam to assist rod 66 in lifting loads such as water in a water pump. The precisely vertical drive of rod 66 via links 62 does not require the counterbalance arms, since vertical reciprocation of rod 66 is a function of the articulated linkage 55 guided by the straight line drive linkage 60 and guide arms 68, 70.

FIG. 9 shows a preferred construction of a guide and counterbalance arm or beam assembly 80'. This assembly has two spaced rails 90. Guide arm portion 68' extends from eye end 92 which receives pin shaft 63' pivotally coupling the guide arm to one end of levers 62. The guide arm portion terminates at fulcrum block 94. Fulcrum block 72 fits between rails 90 and is secured there by fulcrum shaft 96, roller bearing assembly 97, lockwasher 98 and nuts 99, 99'. The portion of arm assembly 80' which extends to the right as viewed in FIG. 9 constitues a counterbalance arm which can be adjustably weighted by plates 100 mounted on bolts 102 extending laterally of rails 90. A bracket 104 containing plates 106 can also be fitted and secured between rails 90. The arm assembly terminates in an end plate 106'. The arm assembly extends through opening 107 in end wall 108 of housing 40.

Fulcrum block 72 as further shown in FIG. 9 has a threaded stud or bolt 109 which extends through spacer block 110 and stand 74 carried by flange plate 115 of housing 40. Fulcrum block 72 is locked in position by nut 112. By this arrangement the entire guide arm and counterbalance arm assembly pivots on fulcrum shaft 96 during operation of the windmill head mechansim.

Figure 5:
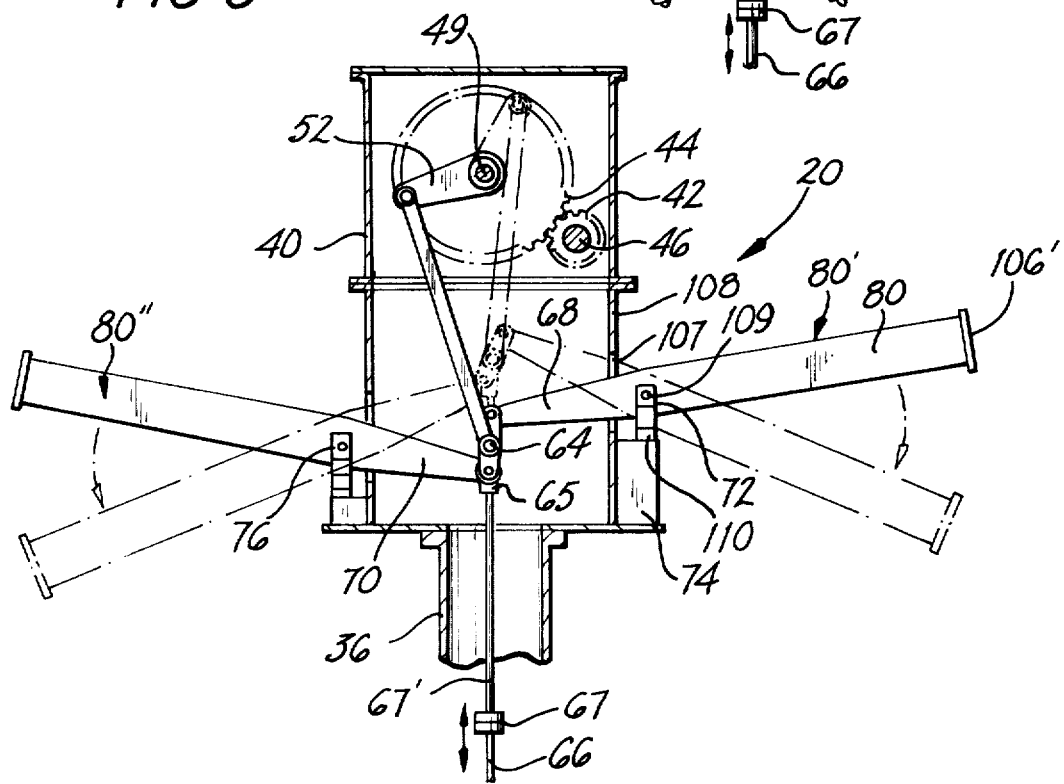
FIG. 5 is an enlarged fragmentary sectional view, partially diagrammatic in form, taken on line 5—5 of FIG. 3.

FIG. 5 shows how the guide arm and counterbalance assemblies 80', 80" turn clockwise and counterclockwise respectively when the straight line drive linkage 60 rises, and they turn in opposite directions when linkage 60 descends to guide rod 66 in a straight vertical line.

FIG. 8 shows in detail the mounting assembly for drive shaft 46. This shaft has a splined end 110 and annular flange 111 at its opposite outer end. Bolts 112 extend through flange 111 and spacer ring 114 to engage spider plate 116 in hub 118. Fan 41 shown in FIGS. 1, 2, 3 mounts on hub 118. The hub rotates freely on stationary sleeve 120 supported by ball bearings 122. Sleeve 120 is secured to wall 124 of housing 40 and is secured against lateral movement by U-bolt 126. The entire weight of fan 41 rests on hub 118 carried by sleeve 120. The fan driven hub rotates shaft 46 which in turn rotates pinion gear 42 which turns large spur gear 44 shown in FIGS. 5 and 6.

FIG. 10 shows graphically the basic mode of operation of articulated crank linkage 55 and straight line drive linkage 60. Crank 52 pivotally connected to pitman 54 rotates in a circle C on shaft 49. Pitman 54 is connected to shaft 64 at the center of link 62. This causes guide arms 68, 70 to move through equal angles and arcs A1, A2 while shaft 64 moves up and down a predetermined distance in straight line V. If it is desired to move shaft 64 a shorter distance up and down on line V this can be accomplished as shown in FIG. 11 by extending upper guide arm 68'inwardly and connecting pitman 54 to a point at or closer to the end of guide arm 68'. The guide arms 68', 70' will then move through smaller equal angles and arcs B1, B2 while shaft 64 will move up and down a shorter distance in direction V than for the arrangement of FIG. 10. Shaft 49 on which crank arms 52 rotate will be offset laterally from line V due to the extended length of arm 68' in crank linkage 55'. If it is desired to move shaft 64 a longer distance than in FIG. 10, it will be only necessary to connect pitman 54 to arm 68' at a point between line V and the fulcrum point of arm 68' at the other side of link 62.

It is not desired to transmit any downwardly directed force from drive linkage 60 to load lifting rod 66, so the lost motion arrangement of FIG. 6 is provided. A lost motion device such as a non-twistable chain of links 73 is connected to swivel joint 67. The chain carries load lifting rod 66'. The chain operates in tension to lift rod 66' vertically but cannot drive the rod axially downward. The rod descends of its own weight. Swivel joint 67 permits linkage 60 to turn with housing 40 without turning load lifting rod 66'. Chain 71 resists twisting torque so it can function effectively in pulling rod 66' upwardly without turning the rod, and without transmitting downwardly directed force to the rod.

FIG. 12 shows another arrangement for the articulated crank linkage 55a. Here the crank linkage employs a single crank arm 52a and a single pitman or connecting rod 54a, instead of the two crank arms and two pitmans shown in FIG. 6. Pitman 54a is secured to connecting block 65a of straight line drive linkage 60. The connecting block carries load lifting rod 66 via swivel 67 and shaft 67'. Crank arm 52 rotates on shaft 49 driven by spur gear 44 which is driven by pinion gear 42 on shaft 46. Shaft 46 extends through stationary sleeve 120 and is driven by hub 118 on which the wind wheel mounts as explained above in connection with FIG. 8. The straight line drive linkage 60 operates in the same manner as described above in connection with FIG. 7, constrained by guide arms 68, 70 integral with counterbalance arms 80.

Figure 13:
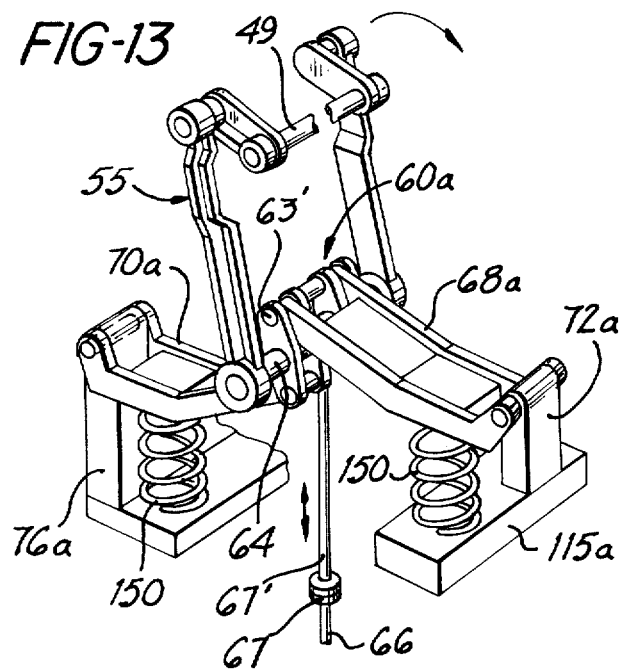

FIG. 13 shows another counterbalance arrangement. Here coil springs 150 are disposed underneath guide arms 68a, 70a pivotally mounted on stationary fulcrum blocks 72a, 76a. The springs rest on stationary housing flanges 115 along with coil springs 150. The springs are alternately compressed when rod 66 moves down and expand to assist it in raising a load. The crank linkages 55 and straight line drive linkage 60a operate in the same manner as described in connection with FIG. 6 to reciprocate rod 66 in a precisely vertical path.

Figure 14:
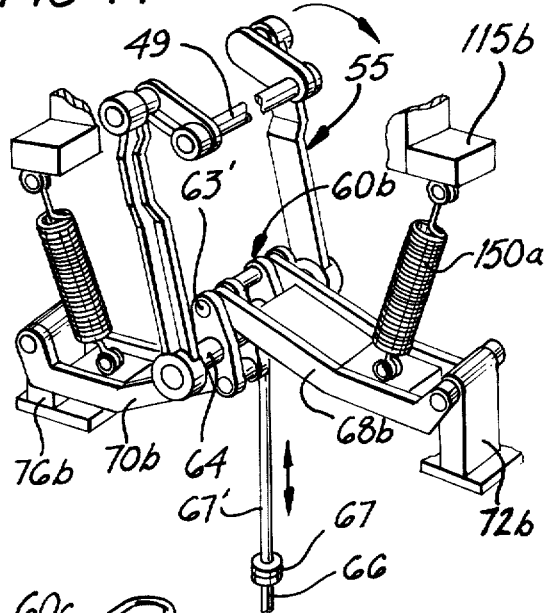

In FIG. 14 the counterbalancing is provided by coil springs 150a secured at upper ends to upper housing flanges 115b, and at lower ends to guide arms 68b, 70b of straight line drive linkage 60b. Here the springs are expanded in tension when load lifting rod 66 moves down and are contracted to assist rod 66 when the rod and load are lifted. Here again rod 66 is moved up and down in a precisely vertical path by articulated crank linkage 55 and straight line drive linkage 60.

Figure 15:
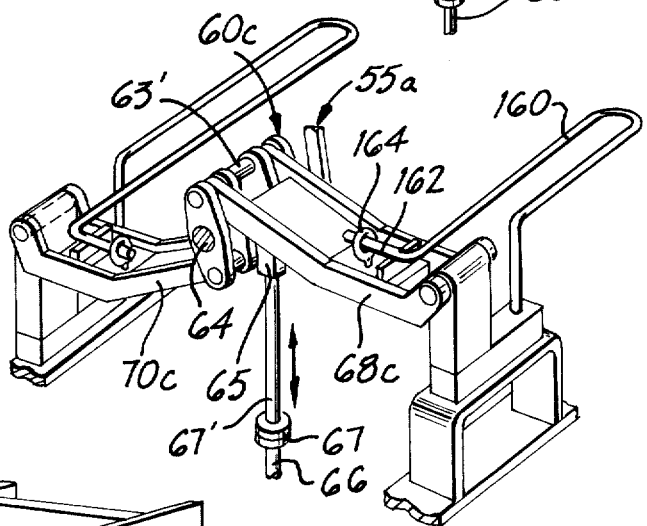

In FIG. 15 the counterbalancing for load lifting rod 66 is provided by twistable U-shaped torsion bars 160. One end 162 of each bar is bent laterally and secured in an eyebolt 164 on guide arms 68c, 70c of straight line drive linkage 60c. The parts of articulated crank linkage 55c are omitted from FIG. 15 but they are connected to shaft 64 in the same manner as shown in FIGS. 13 and 14. As drive linkage 60c moves rod 66 up and down in a precisely vertical direction, the guide arms pivot against tension in twisting torsion bars 160. The bars are fully tensioned when rod 66 carried by block 65 and shaft 64 moves down, and they relax to assist the rod and load to move upwardly.

Figure 16:
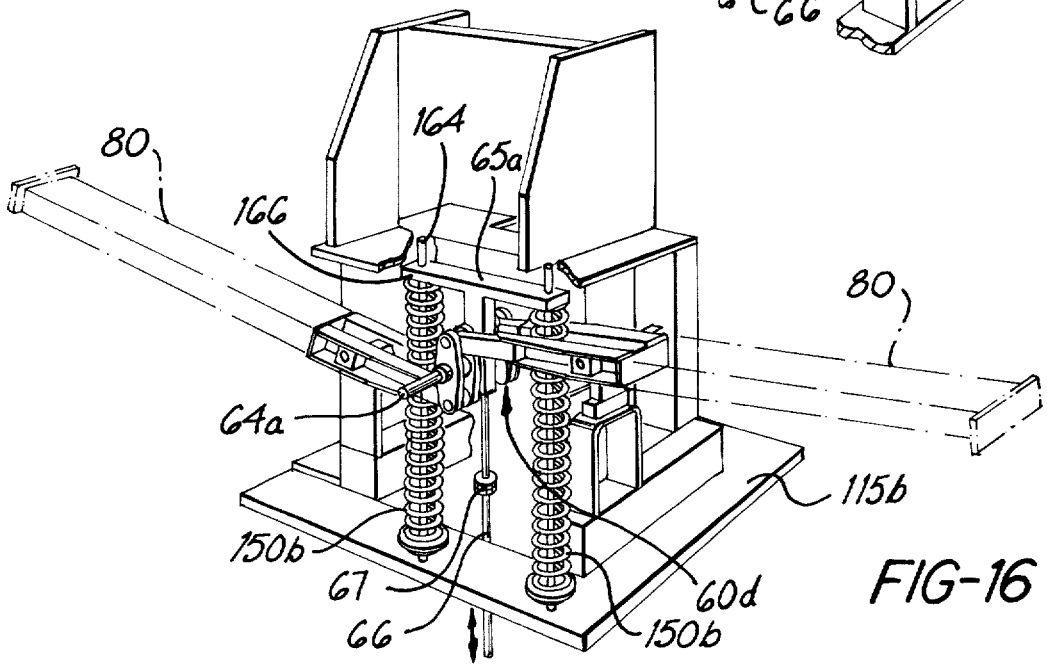

FIG. 16 shows a further counterbalancing arrangement for rod 66. Here coil springs 150b are mounted in axially vertical positions on housing flange plate 115b. Rods 164 have threaded lower ends which are screwed into plate 115b. The rods extend axially upward through springs 150b. Connecting block 65a to which rod 66 is connected is extended upwardly of shaft 64a and has lateral arms 166 which bear on the upper ends of springs 150b. Rods 164 extend through holes in arms 166 so that block 64a moves up and down on rods 164. It will be apparent that the springs are compressed when drive linkage 60d moves down and the springs expand when linkage 60d moves up to assist rod 166 in lifting a load. The crank linkage will be connected to shaft 64a in the same manner as shown in FIGS. 13, 14 to reciprocate drive linkage 60d. The spring and rod arrangement of FIG. 16 replaces the counterbalance arms 80 indicated by dotted lines and used in windmill head 20 of FIGS. 1–6 to assist in lifting the pump rod.

WIND TRACKING

In a windmill used for driving a lift pump it is necessary that the windmill head always respond instantly to any change in wind direction, or else the full force of the wind will not be utilized to turn the windmill fan, and hence a maximum quantity of water per unit time will not be pumped. This can best be explained by reference to the following equation: $P = KAV^3$, where P is the Power generated, K is a Constant depending on air density, air pressure and other physical parameters. A is the Area of the wind wheel or fan facing the wind. V is the velocity of the wind impinging on the fan. If the wind direction changes so that the wind wheel does not face the wind directly, the wind wheel presents an elliptical rather than a full circular face to the wind. This reduced area facing the wind results in a loss of power generated as indicated by the above equation. Any reduction in A casuses a loss in power P proportional to the reduction in wind wheel area facing the wind. Conventional windmills almost universally suffer the disadvantage that they do not respond instantly to every change in wind direction, so that at all wind velocities sufficient to turn the wind wheel, it does not turn with full power which it would have if it faced the wind directly. In this invention by contrast, the fan 41 responds to a change in wind direction by turning the fan at wind velocities less than required to turn the fan. Housing 40 with fan 41 will turn at wind velocities not greater than the minimum velocity required to turn the fan. This is accomplished by the cooperative operation of bearings 30, 32, 34 and tail assembly 80.

Tail assembly 180 shown in FIGS. 1 and 2 has an open framework 181 reinforced by cross wires 192. At the outer free end of the tail frame is an assembly of plates 194, 196. Plates 196 define a split V-shaped formation at the apex of which is tail plate 194; see FIG. 1A. The rear diverging plates 196 are corrugated to increase their strength and to expose the plates to maximum force of the impinging wind. Plates 196 may be slotted near plate 194 to provide for air flow behind the plates, which would produce an aerodynamic rarefaction resulting in a differential air pressure on either side of plates 196, thereby pushing to increase turning torque of the tail assembly.

The plate structure is reinforced by cross bars 197 and brace wires 199. The front end of the tail frame is secured to housing 40. When the direction of wind impinging on wind wheel 41 changes, tail assembly 180 responds readily to turn housing 40 on bearings 30, 32, 34 shown in FIG. 4. The drive gears, articulated crank linkage, straight line drive linkage, guide arms and counterbalance arms all turn with housing 40 and tail assembly 180 in response to a wind velocity as low as one-half mile per hour which is much less than the wind velocity required to turn wind wheel 41. By contrast prior windmill heads require wind velocity almost equal to the velocity required to turn the wind wheel, to turn the wind wheel into the wind. Thus prior windmills lose power while tracking the wind.

Windmill head 20 as described can operate to lift rods 66 or 66' where wind velocities are less than five miles per hour. By contrast prior windmills require wind velocities as much as 15 miles per hour to operate to deliver power.

Figure 17:
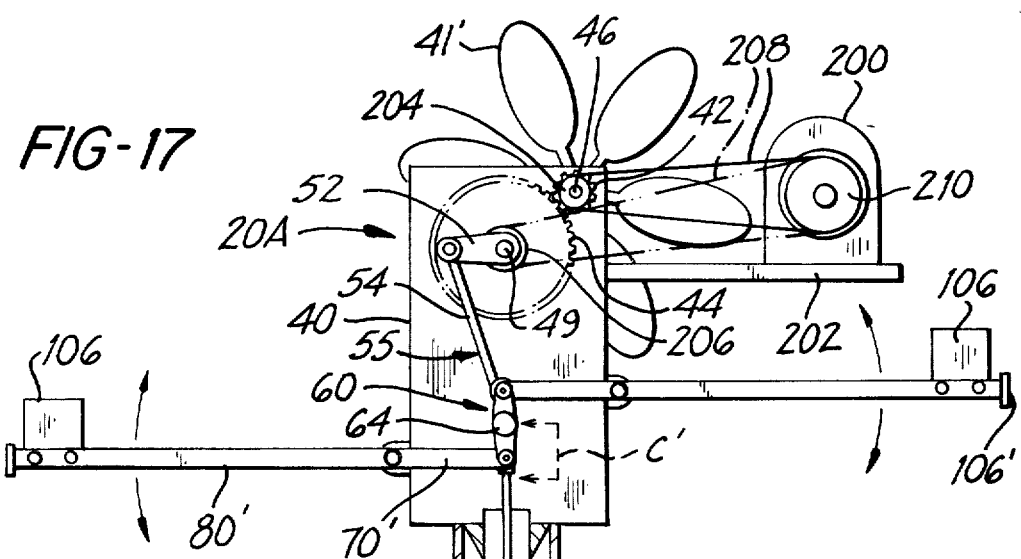
FIGS. 17 and 18 are elevational views, partially in cross section, and partially diagrammatic illustrating modifications of the invention.

FIG. 17 shows a modification of the invention in which windmill head 20A has an auxiliary motor 200 driven by oil or other fuel, mounted on a platform 202 secured to housing 40 and extending laterally therefrom. Wind wheel or fan 41' rotates at the front of the windmill head driven by the wind. A pulley 204 is shown mounted on shaft 46 and another pulley 206 is mounted on shaft 49. A belt 208 is entrained on motor drive pulley 210 and on pulley 204. This arrangement permits motor 200 to drive crank linkage 55 and drive linkage 60 via gear train 42, 44. This arrangement can be used when the wind driving fan 41 fails or is of too low velocity to deliver sufficient power required. Motor 200 lifts counterbalance arms 80' while lowering guide arms 70'. Rod 66 moves downwardly by its own weight indicated by the single arrow A. The greater lifting force indicated by multiple arrows B is transmitted via chain 71 and swivel joint 67. Swivel 67 is connected via rod 67" to shaft 64 as indicated by dotted arrow C'.

Where water is to be pumped from a shallow well, belt 208 can be entrained on pulley 206 as shown by dotted lines in FIG. 17, to drive shaft 49 directly and bypassing gear train 42, 44, since less weight lifting power is required. Thus more water will be pumped per unit time.

Where water is to be pumped from a deep well and more weight lifting power is required then the mechanical advantage derived from using gears 42, 44 may be had. Belt 208 will then be engaged on pulley 204 as shown in solid lines in FIG. 17. Now shaft 49 will turn slower than when it is directly driven by motor 200, but greater lifting power will be provided to lift rod. Of course less volume of water per unit time will be pumped. In all arrangements, the lost motion linkage 71 prevents application of downwardly directed force on the relatively narrow load lifting rod 66.

Figure 18:
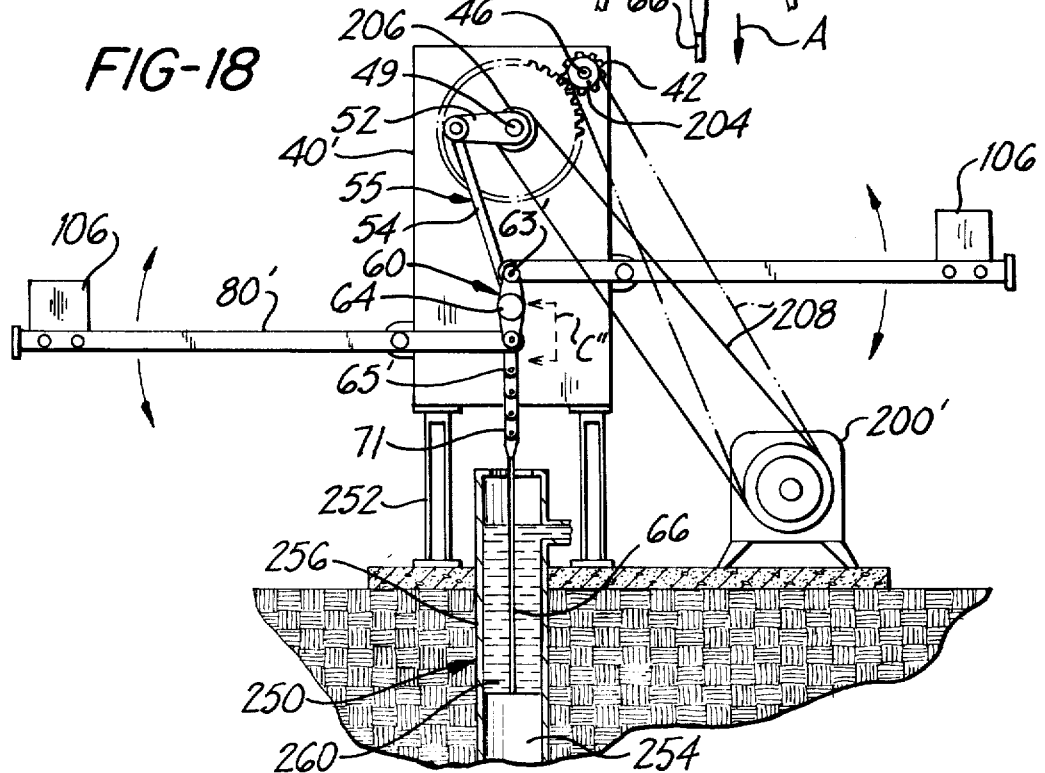

FIG. 18 shows how the basic mechanism of the windmill head can be used to operate a water pump 250. Housing 40 is set on posts 252 resting on the ground. Load lifting rod 66 is connected to piston 254 in well casing 256, and to the lower end of lost motion chain linkage 71. Linkage 71 is connected to the center of shaft 64 of drive linkage 60 via connecting block 65' as indicated by dotted arrow C". Motor 200' rests on the ground. The motor is shown driving pulley 206 on shaft 49 to drive shaft 49 via belt 208 bypassing gear train 42, 44. If back gear drive of shaft 46 should be desired to increase mechanical advantage, belt 208 will be entrained on pulley 204 carried by shaft 46 as shown by dotted lines in FIG. 18. Crank linkage 55 and drive linkage 60 exerts a downward force on shaft 64 to lift counterweight arms 80'. Rod 66 descends of its own weight. Descending arms 80' assist in lifting rod 66 and water load 260 in well 256. By this arrangement, motor 200' can be used for direct drive or back gear drive of the crank linkage and straight line drive linkage.

It will be noted that in all embodiments of the invention, the mechanism provides a precisely vertical push-down force through crank arm and connecting rod linkage 55 to shaft 64 guided by straight line drive linkage 60 and a pair of guide arms 68, 70; 68a, 70a; 68b, 70b; or 68c, 70c. These lift and reset arms 80 and 80' or reset springs 150, 150a, or 150b, or reset torsion bars 160 for the next lift cycle, without imposing any downward force at any time on lift rod 66, because the lost motion device 71 prevents application of downwardly directed force on the rod. Such an application of a lost motion device is not found in any prior windmill.

Although a limited number of embodiments of the invention have been described other modifications are possible. For examples: The gear train 42, 44 can be replaced by other gear means such as a sprocket gear and chain. Alternatively gears 42, 44 can be omitted entirely from windmill head 20, and fan 41 can be mounted on shaft 49 to drive crank linkage 55 directly, where the mechanical advantage provided by gears 42, 44 is not required and it is desired to increase the volume of water pumped per unit time. Furthermore, the wind wheel or fan 41 can be omitted when the mechanism is used to drive a lift pump by a motor operated by a power source other than wind. Also, the lost motion device can be a chain of double links rather than single links, or it could be a telescopic arrangement of tubular members or rods, or it could be a flexible bar or strip incapable of imparting a downward push. Further modifications of the invention are possible without departing from the invention as defined in the appended claims.

What is claimed is:

1. A gearless straight line drive mechanism drivable by a power source for operating a pump or the like, comprising:
   a support;
   a rotatable first shaft carried by said support and drivable by said power source;
   a crank arm secured to said shaft and rotated thereby;
   a connecting rod pivotally connected to said crank arm and reciprocated thereby up and down while said shaft rotates;
   an axially horizontal second shaft carried by said connecting rod and reciprocated thereby up and down;
   an axially vertical member secured to said second shaft and reciprocated thereby for operating said pump;

a flat, elongated, symmetrical link secured at its center to said second shaft and disposed in a first vertical plane;

a pair of guide arms pivotally carried by said support and arranged to pivot in a second vertical plane parallel to said first vertical plane, opposite ends of said link being pivotally secured to said guide arms respectively to turn in opposite directions in said first vertical plane, while said center of said link reciprocates in a precisely vertical direction, and said link and said guide arms constrain said second shaft to move up and down in a precisely vertical path while said connecting rod reciprocates said second shaft up and down, so that said member reciprocates in a precisely vertical direction for operating said pump.

2. A mechanism as defined in claim 1, further comprising counterbalance means bearing on said guide arms to assist said second shaft in cyclically lifting said member for operating said pump.

3. A mechanism as defined in claim 2, wherein said link is disposed on said second shaft laterally of one side of said member, and further comprising: another flat elongated symmetrical link secured at its center to said second shaft laterally of the other side of said member and parallel to said first named link, to balance said second shaft while reciprocating said member, opposite ends of said other link being pivotally secured to said guide arms respectively to cooperate with said first named link in guiding said second shaft to move in said precisely vertical path.

4. A mechanism as defined in claim 3, wherein said crank arm is connected to one end of said first shaft, and said connecting rod is connected to one end of said second shaft, and further comprising:

another crank arm connected to the other end of said first shaft parallel said first named crank arm for balancing said first shaft; and another connecting rod pivotally connected to said other crank arm parallel to said first named connecting rod and reciprocated by said other crank arm while said first shaft rotates, said other connecting rod being connected to the other end of said second shaft for cooperating with said first named connecting rod in reciprocating said second shaft.

5. A mechanism as defined in claim 2, further comprising a wind driven fan operatively arranged to drive said first shaft.

6. A mechanism as defined in claim 2, further comprising a motor operatively arranged to drive said first shaft.

7. A mechanism as defined in claim 2, wherein said counterbalance means are springs carried by said support.

* * * * *